United States Patent [19]

Fudim

[11] Patent Number: 5,135,379
[45] Date of Patent: Aug. 4, 1992

[54] APPARATUS FOR PRODUCTION OF THREE-DIMENSIONAL OBJECTS BY PHOTOSOLIDIFICATION

[76] Inventor: Efrem V. Fudim, 4815 N. Marlborough Dr., Milwaukee, Wis. 53217

[21] Appl. No.: 277,226

[22] Filed: Nov. 29, 1988

[51] Int. Cl.$^5$ .................................................. B29C 35/08
[52] U.S. Cl. ............................. 425/174.4; 250/432 R; 250/492.1; 264/22; 427/53.1; 427/54.1; 427/55
[58] Field of Search ............... 425/174.4, 174, 162, 425/425; 264/22, 25, 219, 250, 255, 1.7; 430/321, 306, 309, 271; 427/53.1, 54.1, 55; 250/432 R, 433, 492.3, 492.1

[56] References Cited

U.S. PATENT DOCUMENTS

| | | | |
|---|---|---|---|
| 4,137,081 | 1/1979 | Pohl | 430/306 X |
| 4,139,654 | 2/1979 | Reed | 264/22 X |
| 4,174,218 | 11/1979 | Pohl | 430/309 X |
| 4,228,232 | 10/1980 | Rousseau | 430/271 |
| 4,376,160 | 3/1983 | Evanchuk | 427/54.1 X |
| 4,575,330 | 3/1986 | Hull | 425/174.4 |
| 4,640,727 | 2/1987 | Jansssen | 427/54.1 X |
| 4,672,024 | 6/1987 | Giaver et al. | 427/54.1 X |
| 4,752,498 | 6/1988 | Fudim | 425/174.4 X |

FOREIGN PATENT DOCUMENTS

| | | | |
|---|---|---|---|
| 260125 | 12/1985 | Japan | 427/53.1 |
| 114818 | 6/1986 | Japan | 425/174.4 |
| 116320 | 6/1986 | Japan | 425/174.4 |
| 116322 | 6/1986 | Japan | 425/174.4 |
| 626967 | 9/1978 | U.S.S.R. | 264/1.7 |
| 626968 | 9/1978 | U.S.S.R. | 264/1.7 |

OTHER PUBLICATIONS

Fudim, E. V.; "A New Method Of Three-Dimensional Micromachining", *Mechanical Engineering*; Sep., 1985; pp. 54-59.

Fudim, E. V.; "Sculpting Parts With Light"; *Machine Design*; Mar. 6, 1986; pp. 102-106.

Kodama, H.; "Automatic Method for Fabricating A 3-D Plastic Model With Photo-Hardening Polymer"; *Review Of Scientific Instruments*; vol. 52, No. 11, Nov. 1981, pp. 1770-1773.

Herbert, A. J.; "Solid Object Generation"; *Image Technology*; *J. Of Applied Photo. Engin.*; vol. 8, No. 4; Aug. 1982,

*Primary Examiner*—Richard L. Chiesa

[57] ABSTRACT

An improved apparatus forms three-dimensional objects in layers by modulating irradiation of liquid photopolymers, either stepwise by alternating photopolymer deposition and irradiation, or continuously by simultaneous deposition and irradiation. Photopolymer is deposited onto open, unfenced and uncontained, substrate and is contained by a photopolymer wall formed around the object simultaneously with it by supplemental irradiation, for providing to irradiated layer unobstructed access critical to apparatus simplification, automation, fabrication time and to feasibility of continuous forming. To decrease drastically fabrication time, whole layer is irradiated simultaneously using masks photoplotted on a roll of film or a matrix of miniature individually controlled components tightly packed similar to liquid-crystal displays, with shrinkage distortion minimized by constraining the irradiated photopolymer surface and/or by solidifying infinitely thin surfaces in continuous mode.

19 Claims, 1 Drawing Sheet

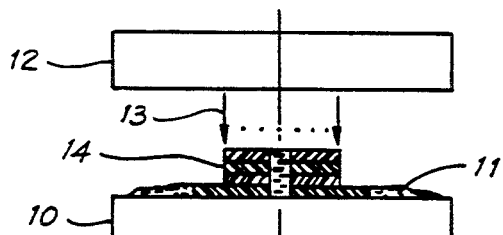
FIG. 1
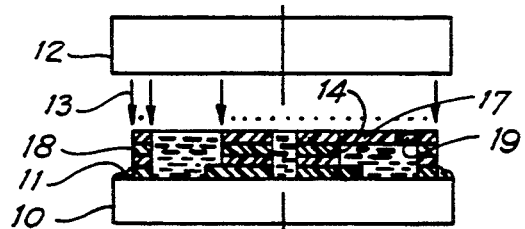
FIG. 4A
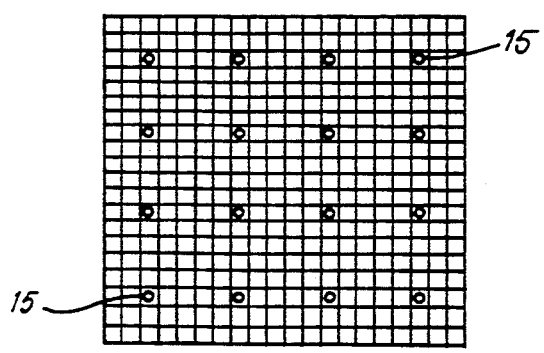
FIG. 2
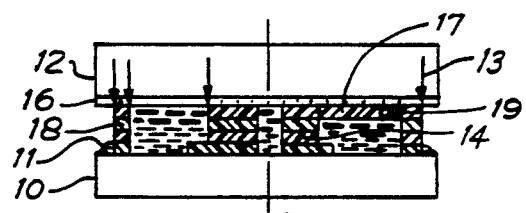
FIG. 4B
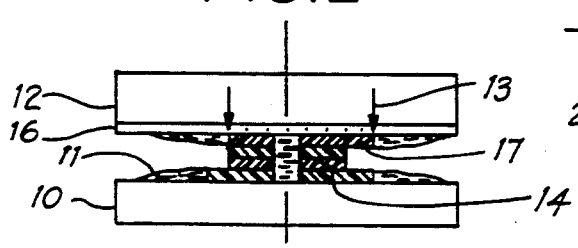
FIG. 3
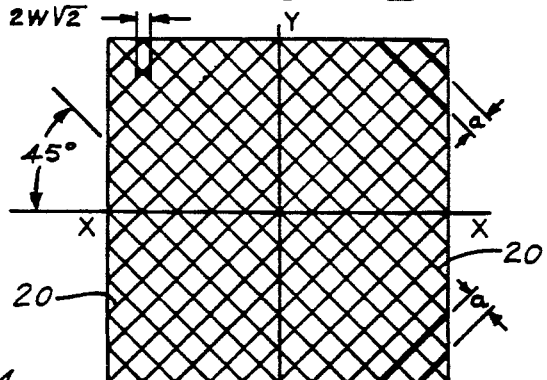
FIG. 5
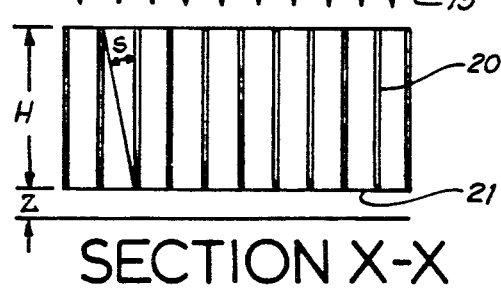
SECTION X-X

APPARATUS FOR PRODUCTION OF THREE-DIMENSIONAL OBJECTS BY PHOTOSOLIDIFICATION

RELATED DISCLOSURE DOCUMENTS

Disclosure documents No.160045; 160694 and 211682 describing the invention were filed with the U.S. Patent Office on Dec. 2, 1986; Dec. 16, 1986 and Oct. 6, 1988 respectively.

FIELD OF THE INVENTION

This invention relates generally to improvements in a method and apparatus for production of three-dimensional objects. More specifically, it relates to a method and apparatus for forming three-dimensional objects by the irradiation of photopolymers. Term "photopolymer" is used in this specification to designate any liquid that cross-links in response to radiation of any wavelength and by any particles so that the cross-linked portion maintains its geometrical configuration until it is freed from unsolidified liquid and provided with final properties employing any prescribed postprocessing with chemicals, flooding irradiation, heat, or other means.

BACKGROUND OF THE INVENTION

Fabrication by irradiation is faster and more energy efficient than traditional methods, and owing to the efficiency of radiation modulation, the process lends itself to high degree of automation. With direct control of irradiation by data about object cross-sections automatically generated from object configuration in computer-aided design (CAD) systems, and with simultaneous fabrication of whole layers, objects can be formed hundreds of times faster than with traditional manufacturing processes and totally automatic. Expediency is crucial in many areas including modeling and prototyping and is the key to competitiveness in automotive and other industries. Many configurations like those with enclosed cavities or incorporating several different materials cannot be made monolithically with other methods.

Several methods and apparatus have been developed for the production of three-dimensional objects by irradiation of photopolymers that cross-link and solidify upon irradiation. Some of them are based on solidification in a tank point by point by optical scanning with two intersecting beams; or by mechanical scanning with irradiation means within the liquid when solidification can be accomplished by whole layers or in other large portions (U.S. Pat. No. 4,801,477). In other systems objects are formed layer by layer solidifying the top layer of photopolymer in a tank, either by simultaneous irradiation of whole layers with irradiation means in contact with the liquid in order to minimize shrinkage distortion, and adding liquid on top for subsequent layers (U.S. Pat. No. 4,752,498), or by solidifying each layer point by point with fast scanning of the top surface open to air, and dropping down the solidified layer so that radiation is always applied to the same plane (U.S. Pat. No. 4,575,330).

Those systems usually employ a prefabricated container filled with photopolymer liquid, and a substrate upon which object is formed is positioned within the liquid in the container. The fabrication process is intermittent, with deposition and irradiation alternating, and substrate (or container together with irradiation means) is usually repositioned after each layer is formed so that the container extends up to the irradiated surface, limiting access to formed portions. Containers and substrates exceed biggest objects formed and large quantities of photopolymer and moving mass are involved.

To provide high accuracy of fabrication, objects are formed in very thin layers requiring a great number of photopolymer depositions. With requirements of multiple fast movements, very small layer thickness, and simultaneous irradiation of the whole layer (for fast fabrication) in maximal proximity (for higher accuracy), containers extending up to the irradiated surface and large moving mass make the deposition process difficult to implement and time consuming. Consequently, fabrication is complicated and slow, and much faster continuous fabrication requiring continuous deposition becomes impractical.

Elimination of the container would provide a significant simplification of the apparatus, contribute to drastic reduction of fabrication time, and open the way to continuous fabrication free of burdening multiple successive depositions.

SUMMARY OF THE INVENTION

The primary objects of the present invention are to provide an improved apparatus and method for making three-dimensional objects by the photosolidification of photopolymers.

The present invention provides an apparatus employing no container. Photopolymer is deposited onto a substrate having no protrusions that reach the plane of photopolymer irradiation or that interfere with deposition or irradiation means that have to be in maximal proximity to that plane. The object is exposed providing unobstructed access to the layer being solidified simplifying the apparatus and its automation, and decreasing fabrication time.

For fast fabrication, the whole layer is irradiated simultaneously using a matrix of miniature components modulated by software, or masks made on a film in the order of irradiation and automatically advanced as in movie projecting.

To contain photopolymer needed to form overhang areas, and to make possible simultaneous formation of short suspenders supporting the overhangs, additional radiation is provided for forming a wall around the object simultaneously with it. The wall is formed close to the object to minimize the quantity of photopolymer contained and the length of suspenders.

For higher accuracy, irradiation is done in contact with photopolymer providing automatic integration of formed layers.

The apparatus can operate in intermittent stepwise mode in which photopolymer is deposited in layers of finite thickness, depositions alternate with irradiations, and object accuracy is limited by layer thickness. It can operate also in a continuous mode in which photopolymer is deposited continuously in infinitely thin surfaces and irradiated at the same time with an irradiation beam continuously changing with object thickness as object cross-section does.

Hence, the apparatus of the present invention satisfies an existing need for a fast, accurate and economic fabrication of three-dimensional objects automatically controlled by computers or other means.

These and other objects and advantages of this invention will be apparent from the following description and accompanying drawings of illustrative embodiments.

BRIEF DESCRIPTION OF DRAWINGS

In the drawings:

FIG. 1 is a view of a preferred embodiment of the apparatus of the invention;

FIG. 2 a bottom view of integrated deposition-irradiation means of matrix type;

FIG. 3 is an embodiment of the invention with irradiation means in contact with photopolymer;

FIGS. 4A and 4B are embodiments of the invention that form a wall around the object;

FIG. 5 is a top view and section of a radiation collimator.

DESCRIPTION OF THE PREFERRED EMBODIMENT

As seen in FIG. 1, the apparatus includes a preferrably stationary substrate 10 having a flat top surface, deposition means (not shown) for depositing a uniform layer of liquid photopolymer 11, and irradiation means 12 providing necessary radiation 13 simultaneously to all areas of photopolymer 11 that should be solidified. Substrate 10 has no wall around photopolymer 11 and is not immersed in any container, letting unsolidified photopolymer surrounding the solidified object to drain exposing the object and providing unobstructed access to it. A uniform layer is deposited by spraying or pouring preferably an excessive quantity of photopolymer and bringing it to required thickness with a strike bar or other means.

To form a desired three-dimensional object 14 with the described apparatus, a preferably uniform layer of photopolymer 11 corresponding to the thickness of the layer to be formed is deposited onto substrate 10. Then radiation is applied, from a minimal distance, by irradiation means 12 to solidify photopolymer 11 in desired areas (solidified areas are shown as cross-hatched) and to secure it to substrate 10. When an effective amount of radiation is applied to some areas while none or below the minimal amount to others, a planar section featuring exclusively through-holes and 90 degree walls is solidified. If actual object walls are at other than 90 degree angles, the thinner the layer of photopolymer 11 the higher the accuracy of fabrication will be.

To form and attach subsequent layers, the above deposition irradiation sequence is repeated until the whole object is formed. For each irradiation, irradiation means 12 are usually repositioned to maintain a constant radiation intensity on the irradiated photopolymer surface, and for other purposes, and each position is such that proper alignment of all formed layers is provided. For higher object accuracy, the gap between irradiation means 12 and object 14 should be minimal, and irradiation applied immediately after photopolymer deposition before photopolymer can drain.

When irradiation means 12 and/or support means 10 are provided with necessary linear and rotational positioning means, object 14 is formed in portions at various spacial angles over different areas of the outer surface of object 14. In this case irradiation means 12 are preferrably of smaller cross-section; liquid deposition means are preferrably attached to irradiation means 12, and several irradiation means (with proper deposition means) can be employed to form several portions of object 14 at the same time.

Besides forming planar layers in intermittent stepwise mode by alternating photopolymer deposition and irradiation as described above, apparatus of FIG. 1 can operate in a continuous mode of object formation in true infinitely thin surfaces by continuously depositing and irradiating at the same time all required areas of the deposited surface simultaneously. Such operation eliminates distortion introduced by finite thickness of planar layers, as well as system complexity caused by multiple successive thin-layer depositions. To form objects in a continuous mode, the apparatus employ deposition means for continuous gradual uniform deposition of photopolymer, along with irradiation means that, similar to movie projecting, continuously change irradiation beam 13 according to object cross-section to be formed. Position of irradiation means 12 is preferably altered continuously to compensate for the increase of radiation intensity on irradiated surface due to photopolymer deposition.

Photopolymer is deposited by nozzles positioned outside the irradiation path 13 and spraying the whole irradiated surface simultaneously. When a sufficient gap between the object and irradiation means is provided, continuous gradual uniform deposition can be done with a row of spraying nozzles across the object that is continuously passing over the object back and forth from end to end at high constant speed. It is preferred that nozzle row is narrower to block a smaller portion of irradiation beam 13, that nozzles are smaller and closer to each other, that nozzle passing speed is higher, spraying is finer and at smaller flow rate, and change of irradiation beam is faster. If beam 13 change takes a relatively significant time, photopolymer deposition is interrupted for the transitional period; as a result, with slow irradiation means object portions featuring gradual cross-section change with thickness are formed stepwise in planar layers of finite thickness. Integrated deposition-irradiation means eliminating mobile deposition means can be made on the basis of matrix-type irradiation means by providing small openings 15 between matrix components or in place of some of them, as shown on FIG. 2, to be used for photopolymer dispensing simultaneously with irradiation.

With height increase of the formed object, especially when formed layer is wider than the preceding one and unsupported overhangs have to be formed, unsolidified photopolymer tends to flow off the overhang areas and cause object distortion.

Improved apparatus without this limitation is illustrated on FIG. 3 where photopolymer is irradiated in contact with irradiation means. This apparatus differs from that of FIG. 1 by additional means preserving subsequent cross-linking capability of irradiated photopolymer implemented, for example, as a layer of fluorinated ethylene propylene 16 on the bottom surface of irradiation means 12. Means 16 enable removal of irradiation means 12 without distorting the solidified surface in contact, and automatic joining of subsequent portions during their formation (U.S. Pat. No. 4,752,498). The bottom portion of irradiation means 12 is flat and rigid enough to provide flatness of the irradiated photopolymer surface. Photopolymer is deposited onto irradiation means 12 that will hold photopolymer needed to form overhang areas 17, however when overhangs 17 are long, they may sag after irradiation means are removed upon irradiation. Deposition is done by spraying, using a roller, etc. preferably in excessive thickness. Proper layer thickness is provided by positioning irradiation means 12, with predeposited photopolymer on them, at respective distance from substrate 10. Upon irradiation, irradiation means 12 can be removed by sliding. Photopolymer can be deposited instead onto object (or substrate), or by spraying or injecting into the gap between object and irradiation means when the gap is small enough and necessary quantity of photopolymer is retained. Contact irradiation provides higher fabrication accuracy due to absence of open irradiated surface that is subject to shrinkage distortion.

To eliminate the limitations on object configuration of apparatus of FIGS. 1 and 3, a surrounding wall 18 containing photopolymer around the object is formed simultaneously with each object layer as shown on FIGS. 4A and 4B. Wall 18 is growing with the object and has the same height. The wall is formed preferrably close to the object. Suspenders 19 (shown in bold lines) that prevent sagging of overhangs 17 by attaching them while they are being formed to wall 18, can be formed along with wall 18. Both surrounding wall 18 and suspenders 19 are formed by additional radiation provided by irradiation means 12.

When all layers are formed, the solidified object is freed from unsolidified photopolymer using heat and/or a suitable solvent like alcohol, and is usually processed with flooding radiation and/or heat or using any other prescribed procedure to achieve desired final properties of the solid object.

A preferred photopolymer liquid for use in the present invention is MAGNACRYL 2296 made by Beacon Chemical Company of Mount Vernon, N.Y., Suitable photopolymers are disclosed in U.S. Pat. Nos. 4,228,232; 4,174,218; and 4,137,081. Other liquids crosslinkable with radiation of different particles and at different wavelengths can be employed.

Substrate 10 can be of glass, plastic, steel or any other material which will serve as a suitable support to which the solidified object will attach and will not displace during object formation. Substrate 10 could be mobile.

Irradiation means 12 can be a laser or other source of sequential irradiation that scans point by point with ultraviolet or other radiation required by the photopolymer used. Means of simultaneous irradiation of all areas of a layer are preferred since they provide much faster fabrication. Such means can be made as a matrix of miniature pixel sources (miniature lasers, light-emitting diodes LED, e.g.) each irradiating an assigned small area and tightly packed as illustrated by FIG. 2. Each source is individually switched on and off or modulated in a continuous mode according to data on object layer configuration coming from a computer-aided design (CAD) or other system; in combination the matrix can irradiate in any desired pattern with the resolution defined by the size of each source beam. Such irradiation means can be comprised also of a source of radiation directed at a matrix of miniature reflectors (mirrors) which are individually turned to either direct or not to direct radiation to an assigned area. Micromachined piezoelectric cantilevers with a proper surface can serve as both reflectors and actuators turning the reflectors.

Irradiation means 12 for simultaneous irradiation can be made as a pattern/mask having opaque and transparent areas, the latter being arranged according to locations of areas to be solidified, backlighted with a source of uniform radiation. Such a pattern can be one that is specially prefabricated for each layer configuration and usually cannot be changed for other configurations; it is made of photoemulsion-coated film or glass plate or of microelectronic glass providing a metallic pattern on glass, using cameras or photoplotters controlled by data from CAD systems.

To automate the fabrication, masks are provided with optical and/or mechanical encoding outside the area of the irradiation pattern itself, that carries values of fabrication parameters, and irradiation means are provided with sensors/decoders to receive the information from the mask.

Perforations on masks combined with camera-type sprocket mechanisms in both irradiation means and in photoplotter that makes the masks on preperforated film, provide positioning of patterns in one direction. For positioning in the perpendicular direction, optical marks on masks made at the time of photoplotting in combination with optical position sensors in irradiation means can be used. To automate mask change, masks are photoplotted in the order of irradiation on a continuous roll of film, are mounted on reels in a cartridge of type used with Kodak 110- and 126-size photographic film, and motors are used to drive the reels.

With an on-line photoplotter, patterns are produced in situ in proper position onto irradiation means eliminating the need for pattern positioning means.

If during their photoplotting masks are optically encoded with the value of object thickness to be reached using the mask, photopolymer deposition and positioning of irradiation means (or alternative procedures) can be automated.

Pattern can be made also as a matrix of tightly packed miniature shutters like flat liquid-crystal displays (LCD) similar to FIG. 2. The shutters are individually opened and closed, and depending on software from CAD or other systems, can provide in combination any pattern needed to form an object layer. It is important, especially for apparatus providing continuous forming, that switching speed of individual software-controlled matrix components or of mask positioners is high so that irradiation beam follows object cross-section change with thickness without significant delays or transitional distortion.

When units (pixels) of matrix pattern or matrix radiation means are not small enough or have wide partitions (occupied by wiring, etc.), a fiberoptic adapter having at the emitting side fibers of required small size and acceptable partitions can be employed.

A suitable source of uniform radiation is a parallel array of General Electric tubular fluorescent lamps emitting UV light in the range of 200 to 500 nm, and preferably about 300 to 400 nm, and providing intensity of several mw/cm.sq. at the top surface of the photopolymer. Single or multiple Mercury or other arc lamps, or a matrix of small laser, LED or other suitable radiation sources can be used. Fiberoptic, liquid-filled or other radiation guides can be used to keep source of radiation remote and stationary while pattern/mask is mobile during fabrication.

For higher accuracy of fabricated objects, radiation should be within a small angle to the direction of irradiation, or collimated. A preferred embodiment of a collimator is shown on FIG. 5. It is comprised of a number of partitions 20 installed preferrably parallel to the direction of radiation Z and dividing beam 13 from the radiation source into a number of smaller beams. Partitions 20 are made of a material that absorbs the radiation. With full absorption, all rays that hit partitions are totally absorbed and do not exit the collimator, while rays that do not hit partitions exit the collimator without being affected by it. Hence, only rays that are within a small angle s from the direction of radiation defined by cell sizes pass the collimator (s=tan$^{-1}$ a$\sqrt{2}$/H, where a is distance between parallel partitions, and H is partition height). At a distance z=wH/a from collimator outlet 21 (w is partition thickness), beams from all cells merge producing a uniform radiation collimated to angle s. To achieve uniformity at any plane, collimator(with source of radiation, or with its radiation guide only) and/or object reciprocate at constant speed along axis x—x with partitions at 45 degree angle to the axis. For still higher radiation uniformity, some areas at each partition intersection can be obstructed as shown in solid black.

When partitions absorb partially, rays entering the collimator at angles exceeding s weaken with each reflection from partitions 20; attenuation grows with angle in multiples of s. By selecting a proper coefficient of absorption, a desired portion of rays at angles over s is added. The efficiency of the collimator increases with decrease of partition width and height, and its collimation improves with distance a decrease. In a preferred embodiment the collimator is made by photosolidification of photopolymers; it can also be assembled of thin-wall square tubes.

While only several preferred embodiments have been shown and described herein, the invention is not intended to be limited thereby but only by the scope of the claims which follow.

I claim:

1. An apparatus for producing a three-dimensional object from photopolymer in successive portions, said apparatus comprising:
   (a) object support means for supporting said object as it is formed,
   (b) irradiation means spaced from said object support means for successive irradiation of layers of quantities of uncured photopolymer to form successive portions of said object, said irradiation means having a surface,
   (c) separate photopolymer deposition means for successive deposition directly onto said surface of irradiation means of said layers of said quantities of uncured photopolymer, and
   (d) positioning means for mutual repositioning of said object support means and said irradiation means for attachment of said layers of said quantities of photopolymer to said object upon irradiation.

2. An apparatus of claim 1 and additionally including additional irradiation means for forming several parts of said object at the same time.

3. An apparatus of claim 1 and additionally including means for preserving subsequent cross-linking capability of irradiated photopolymer.

4. An apparatus of claim 1 wherein said positioning means and said photopolymer deposition means include means for providing desired space between said irradiation means and said object, and means for filling-in said space with uncured photopolymer.

5. An apparatus for producing three-dimensional objects from photopolymer, said apparatus comprising:
   (a) object support means for supporting said object;
   (b) photopolymer deposition means for depositing uncured photopolymer;
   (c) irradiation means for irradiating said uncured photopolymer; and
   (d) wall forming means for irradiating said uncured photopolymer to form a wall around said object for containing uncured photopolymer around said object.

6. An apparatus of claim 5 and additionally including suspender forming means for forming suspenders of portions of said object to said wall.

7. An apparatus for producing three-dimensional objects from photopolymer, said apparatus comprising:
   (a) object support means for supporting said object;
   (b) photopolymer deposition means for depositing uncured photopolymer; and
   (c) an array of irradiating components, each said irradiating component modulating irradiation of a portion of said uncured photopolymer to provide in combination irradiation dictated by configuration of said object.

8. An apparatus of claim 7 wherein said irradiating components include components for modulating radiation transmittance.

9. An apparatus of claim 7 wherein said irradiating components include components for modulating direction of radiation.

10. An apparatus of claim 7 wherein said irradiating components include components for modulating generation of radiation.

11. An apparatus of claim 7 wherein said photopolymer deposition means include a number of photopolymer dispensing components, said photopolymer dispensing components being positioned between said irradiating components.

12. An apparatus of claim 7 and additionally including means for positioning said array in contact with said uncured photopolymer, and means for preserving subsequent cross-linking capability of irradiated photopolymer.

13. An apparatus for producing three-dimensional objects from photopolymer by continuous forming, said apparatus comprising:
   (a) object support means for supporting said object;
   (b) photopolymer deposition means for continuous deposition of uncured photopolymer; and
   (c) irradiation means for providing irradiation of said uncured photopolymer concurrently with said continuous deposition, said irradiation means modulating cross-sectional pattern of said irradiation according to object cross-section being formed.

14. An apparatus of claim 13 and additionally including means for altering mutual positioning of said object and said irradiation means.

15. An apparatus of claim 13 and additionally including wall forming means for irradiating said uncured photopolymer to form a wall around said object.

16. An apparatus of claim 13 wherein said photopolymer deposition means include photopolymer dispensing means for dispensing said uncured photopolymer in a reciprocating fashion.

17. An apparatus of claim 13 wherein said irradiation means comprise an array of irradiating components, each said irradiating component modulating irradiation of a portion of said uncured photopolymer to provide in combination irradiation pattern dictated by configuration of said object.

18. An apparatus of claim 17 wherein said photopolymer deposition means include a number of photopolymer dispensing components, said photopolymer dispensing components being positioned between said irradiating components.

19. Irradiation means for providing collimated radiation in a certain direction within a given spacial angle to said direction, said means comprising:
(a) a source of uncollimated radiation emitting said collimated radiation in combination with undesired radiation at angles bigger than said spacial angle;
(b) a number of partitions for dividing said uncollimated radiation into smaller beams and for absorbing said undesired radiation from said beams.

* * * * *